United States Patent
Kato et al.

(10) Patent No.: US 12,497,149 B2
(45) Date of Patent: Dec. 16, 2025

(54) PROPULSION DEVICE FOR WATERCRAFT

(71) Applicant: HONDA MOTOR CO., LTD., Tokyo (JP)

(72) Inventors: Akira Kato, Tokyo (JP); Takaaki Fushimi, Saitama (JP); Yasuyuki Yamazaki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 185 days.

(21) Appl. No.: 18/425,073

(22) Filed: Jan. 29, 2024

(65) Prior Publication Data

US 2025/0242901 A1  Jul. 31, 2025

(51) Int. Cl.
  *B63H 20/10*  (2006.01)
  *B63B 79/10*  (2020.01)
  *B63B 79/30*  (2020.01)
  *B63B 79/40*  (2020.01)
  *B63H 21/21*  (2006.01)

(52) U.S. Cl.
  CPC .............. *B63H 20/10* (2013.01); *B63B 79/10* (2020.01); *B63B 79/30* (2020.01); *B63B 79/40* (2020.01); *B63H 21/21* (2013.01); *B63H 2021/216* (2013.01)

(58) Field of Classification Search
  None
  See application file for complete search history.

(56) References Cited

U.S. PATENT DOCUMENTS

| 8,277,266 B2 | 10/2012 | Inoue et al. | |
| 2006/0110990 A1* | 5/2006 | Yazaki | B63H 20/12 440/53 |
| 2011/0281477 A1* | 11/2011 | Inoue | B63H 20/10 440/1 |
| 2022/0144401 A1* | 5/2022 | Malouf | B63H 20/12 |
| 2023/0112736 A1* | 4/2023 | Kim | B62D 5/049 701/29.7 |

FOREIGN PATENT DOCUMENTS

| JP | 2011235846 A | 11/2011 |
| WO | 2022190156 A1 | 9/2022 |

* cited by examiner

*Primary Examiner* — Peter D Nolan
*Assistant Examiner* — Jacob Kent Besteman-Street
(74) *Attorney, Agent, or Firm* — Armstrong Teasdale LLP

(57) ABSTRACT

The outboard motor 3 includes an electronic control unit 33 that acquires a trim angle from a trim angle sensor and controls the actuator for trim adjustment. The electronic control unit acquires the trim angle at predetermined time intervals, stores each stably obtained trim angle in the memory as a stop trim angle, and compares each current value of the detected trim angle with the stop trim angle. It is determined if the trim angle sensor is abnormal or not based on the current value of the detected trim angle and the stop trim angle, and when it is determined that the trim angle sensor is abnormal, the operation of the actuator is restricted.

12 Claims, 9 Drawing Sheets

PROPULSION DEVICE FOR WATERCRAFT

TECHNICAL FIELD

The present disclosure relates to a propulsion device for watercraft.

BACKGROUND ART

In recent years, efforts are being made to provide sustainable transportation systems that take into consideration those who are in a vulnerable position among transportation participants. Toward this realization, research and development efforts are being directed to further improve traffic safety and convenience.

For example, WO 2022/190156A1 discloses a trim angle control unit that automatically adjusts the trim angle of an outboard motor having a prime mover according to the rotational speed of the prime mover. This trim angle control unit sets a trim angle target value according to the rotational speed of the prime mover and controls an actuator so that the actual trim angle value detected by the trim angle sensor approaches the trim angle target value. However, if there is a failure in the trim angle sensor to correctly detect the actual trim angle value, the trim angle of the outboard motor cannot be appropriately controlled. JP2011-235846A discloses a method for detecting failures such as wire breaks and short circuits by comparing the output voltage of a trim angle sensor consisting a potentiometer with an upper threshold value and a lower threshold value.

However, this prior art method cannot detect a relatively small failure in which the voltage of the trim angle sensor changes little as compared to the difference between the upper and lower threshold values. For example, if the trim angle sensor is charged with static electricity, the voltage of the trim angle sensor may be offset by a comparatively small value well within the upper and lower threshold values.

In view of such a problem of the prior art, a primary object of the present invention is to provide a propulsion device that can appropriately detect a failure in detecting the trim angle. Thereby, the present invention aims to contribute to the development of a sustainable transport system.

To achieve such an object, the present invention provides a propulsion device (3) configured to be fitted to a hull (2) of watercraft, comprising: a propulsion device main body (4) pivotably supported by the hull around a trim shaft (9); an actuator (21) that pivots the propulsion device main body relative to the hull about the trim shaft; a trim angle sensor (22) that outputs a signal corresponding to an actual trim angle given as an angle of the propulsion device main body around the trim axis; an electronic control unit (33) including a processor (31) and memory (32) communicably connected to the processor, and configured to calculate a detected trim angle from the signal provided by the trim angle sensor, set a target trim angle and control the actuator so as to bring the detected trim angle closer to the target trim angle, wherein the electronic control unit is configured to acquire a current value of the detected trim angle based on the signal from the trim angle sensor at predetermined time intervals, store the detected current trim angle as a stop determination trim angle in the memory at a timing where a difference between the current value of the detected trim angle and a previous value of the detected trim angle has become smaller than a prescribed stop determination value, detect a failure of the trim angle sensor from the current value of the detected trim angle and the stop determination trim angle according to a prescribed timing, and limit an operation of the actuator when a failure of the trim angle sensor is detected.

According to this aspect, the electronic control unit can detect an offset failure in which the detected value of the trim angle sensor deviates from an actual trim angle. The offset failure may be caused by, for example, static electricity being charged on the trim angle sensor. Since the operation of the actuator is restricted when a failure in the trim angle sensor is detected, the actual trim angle is prevented from changing to an inappropriate value.

In this propulsion device, preferably, a failure of the trim angle sensor is detected when a difference between the current value and the previous value of the trim angle is greater than a maximum changing amount of the actual trim angle by the actuator.

Since the trim angle cannot change any faster than the actuator is capable of, if such a rapid change in the trim angle, it can be reliably determined that the trim angle sensor is faulty.

In this propulsion device, preferably, the current value of the trim angle is obtained as a moving average of a plurality of consecutive detected values.

Thereby, any minor fluctuations in the obtained values of the trim angle can be favorably smoothed and eliminated.

In this propulsion device, preferably, a failure of the trim angle sensor is detected when an absolute value of a difference between the current value of the trim angle and the stop determination trim angle is equal to or greater than a second threshold value.

By suitably selecting the second threshold value, a failure of the trim angle sensor can be accurately detected.

In this propulsion device, preferably, the prescribed timing is a timing when the electronic control unit has computed a current value of the detected trim angle.

Thereby, a failure of the trim angle sensor can be promptly detected without any delay.

In this propulsion device, preferably, the propulsion device further comprises an operation unit for an operator to forward a change command to change the trim angle to the electronic control unit, wherein the electronic control unit controls the actuator according to the change command, and the prescribed timing is a timing when the electronic control unit has received the change command.

Since the electronic control unit controls the actuator according to the change command, as soon as the operator experiences discomfort due to the need for trim angle adjustment, and inputs a change command, the automatic trim control is terminated and prevented from operating in an unpredictable manner.

In this propulsion device, preferably, the electronic control unit sets a trim angle target value based on a speed of the hull or a rotational speed of the propulsion device main body, executes an automatic trim control based on the trim angle target value, and performs an automatic trim angle control which controls the actuator so as to bring the current value of the trim angle comes closer to the trim angle target value when an absolute value of a difference between the value of the trim angle and the trim angle target value is equal to or greater than a first threshold value, the prescribed timing being a timing when the difference between the value of the trim angle and the trim angle target value has become greater than the first threshold value.

Since the limiting of the operation of the actuator occurs potentially at the timing of acting on the trim angle in a feedback control, the countermeasure against the failure of the trim angle sensor can be performed without any delay.

In this propulsion device, preferably, the second threshold value is larger than the first threshold value.

Thereby, the operation of the actuator can be restricted in an appropriate situation.

In this propulsion device, preferably, the second threshold value is made smaller when the trim angle target value is larger than the current value of the trim angle than when the trim angle target value is smaller than the current value of the trim angle. Thereby, a worst situation where the propeller of the propulsion device is lifted from the water can be avoided in a more reliable manner.

In this propulsion device, preferably, the propulsion device further comprises an operation unit for an operator to forward a change command to change the trim angle to the electronic control unit, wherein the electronic control unit controls the actuator based on the automatic trim control or the change command, and when an absolute value of a difference between the current value of the trim angle and the stop determination trim angle is equal to or greater than the second threshold value, the automatic trim control is prohibited while the change command is kept enabled. Thereby, even when the trim angle sensor is detected to be faulty, the operator can change the trim angle by operating the operation unit.

In this propulsion device, preferably, the electronic control unit prohibits the automatic trim control when a value of the signal from the trim angle sensor is less than a lower failure determination value or greater than an upper failure determination value. Thereby, a major failure due to such causes as short-circuiting and wire breakage of the trim angle sensor can be detected with a simple structure. In this propulsion device, preferably, the second threshold value is smaller than an absolute value of a difference between a lower abnormal trim angle corresponding to the lower failure determination value, and a possible lower limit value of the trim angle and an absolute value of a difference between an upper abnormal trim angle corresponding to the upper failure determination value, and a possible upper limit value of the trim angle. Thereby, a relatively minor failure, as opposed to those caused by short-circuiting and wire breakage of the trim angle sensor, can be detected in a reliable manner.

The present invention thus provides a propulsion device that can appropriately detect a failure in detecting the trim angle.

DETAILED DESCRIPTION OF THE PREFERRED EMBODIMENT(S)

A boat fitted with a propulsion device according to an embodiment of the present invention will be described in the following with reference to the appended drawings. The propulsion device may be an outboard motor, an inboard/outboard motor or an inboard motor. The propulsion device of this embodiment consists of an outboard motor. The directions mentioned in the following description will be based on the hull of the boat.

Figure 1:
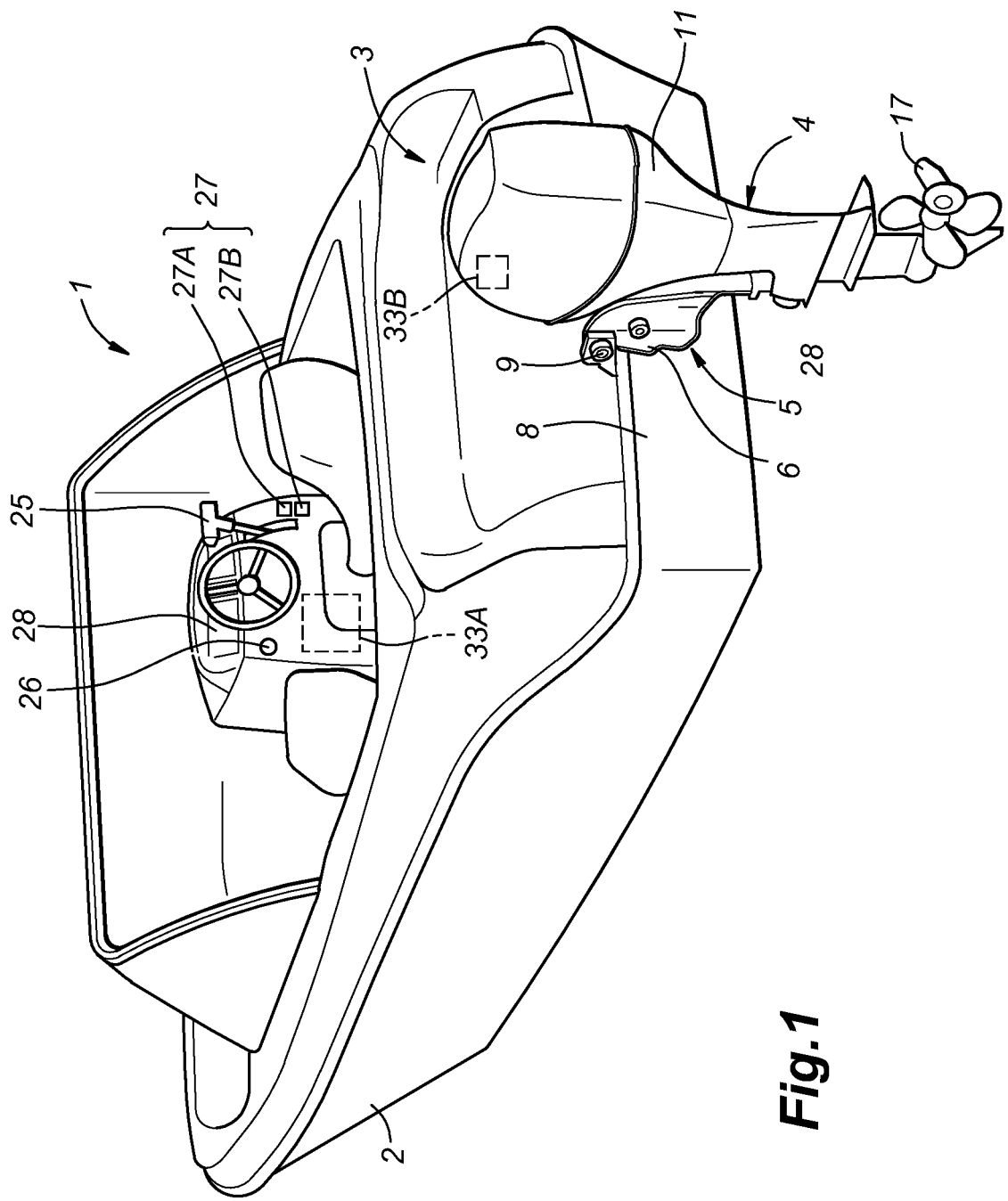
FIG. 1 is a perspective view of watercraft fitted with a propulsion device according to an embodiment of the present invention.

As shown in FIG. 1, the boat 1 includes a hull 2 and a propulsion device consisting of an outboard motor 3 fitted to the stern of the boat 1. The outboard motor 3 includes an outboard motor main body 4 and a support device 5 for supporting the outboard motor main body 4 on the hull 2. The support device 5 includes a stern bracket 6 as a fixed part attached to the hull 2, and a swivel bracket 7 as a rotatable part supported by the stern bracket 6 so as to be rotatable about a trim shaft 9 extending laterally. A transom board 8 is provided at the rear end of the hull 2, and the stern bracket 6 is attached to the transom board 8.

Figure 2:
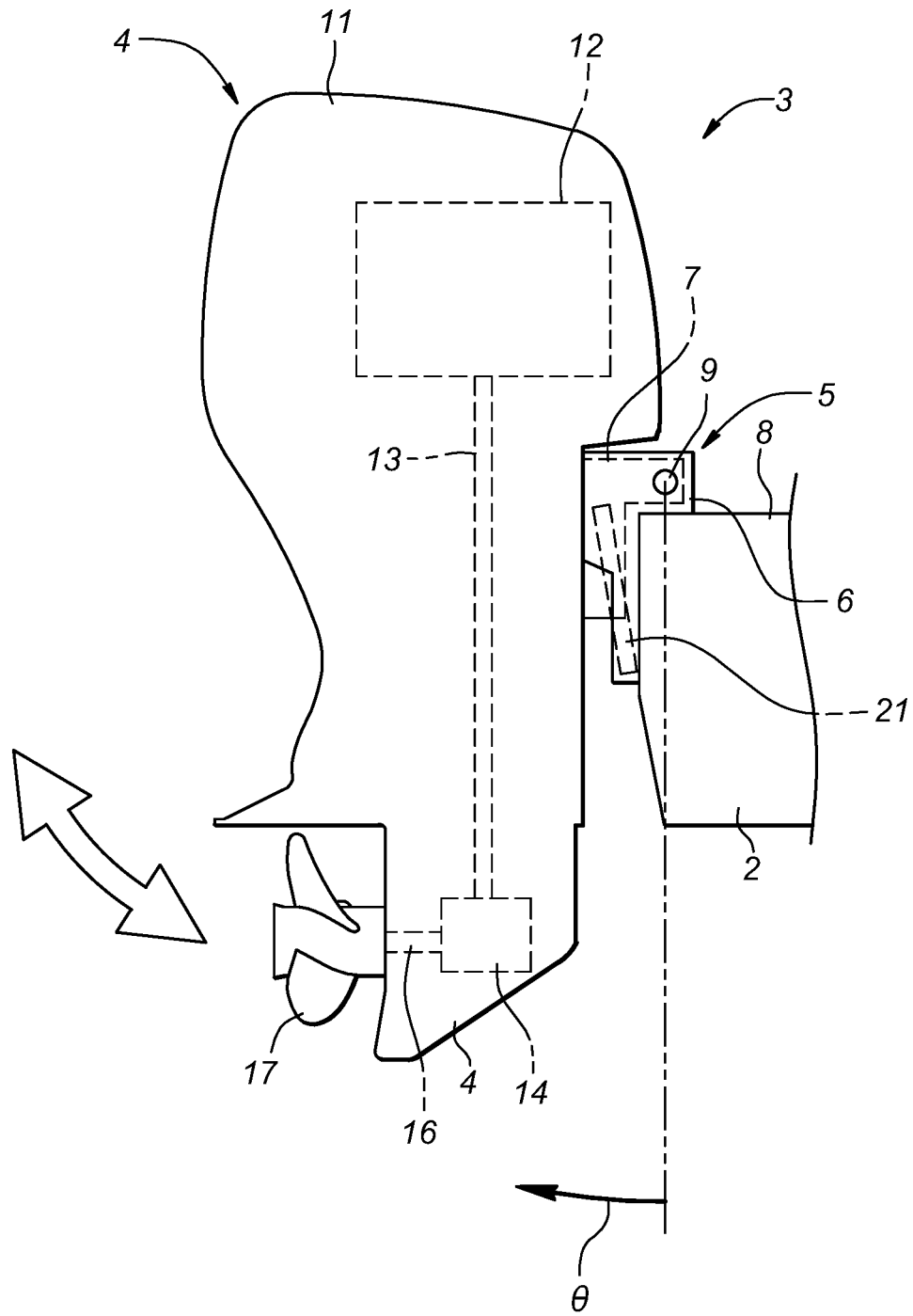
FIG. 2 is a simplified side view of the propulsion device configured as an outboard motor.

As shown in FIG. 2, the outboard motor main body 4 includes a case 11, an internal combustion engine 12 serving as a prime mover, a drive shaft 13, a shift mechanism 14, a propeller shaft 16, and a propeller 17. The case 11 extends in the vertical direction, and is attached to the swivel bracket 7. The case 11 is rotatably supported by the hull 2 via the stern bracket 6 and the swivel bracket 7 about the trim shaft 9. The internal combustion engine 12 is received in an upper part of the case 11.

The drive shaft 13 extends vertically inside the case 11. The upper end of the drive shaft 13 is connected to the output shaft of the internal combustion engine 12. The propeller shaft 16 extends in the lower part of the case 11 in the fore and aft direction. A lower end of the drive shaft 13 is connected to a front end of a propeller shaft 16 via a shift mechanism 14. The shift mechanism 14 connects the drive shaft 13 and the propeller shaft 16 such that the rotational direction of the propeller shaft 16 may be switched between forward and reverse while the drive shaft 13 rotates in one direction at all times. The shift mechanism 14 includes, for example, a first bevel gear coupled to the lower end of the drive shaft 13, a second bevel gear and a third bevel gear rotatably provided at the front end of the propeller shaft 16, a clutch that selectively connects the propeller shaft 16 to one of the second bevel gear and the third bevel gear, and a clutch actuator for actuating the clutch. The second bevel gear and the third bevel gear oppose each other, the second bevel gear meshes with the first bevel gear from the front, and the third bevel gear meshes with the first bevel gear from the rear. The clutch actuator switches the clutch so as to change the rotational direction of the propeller shaft 16. The rear end of the propeller shaft 16 projects rearward from the case 11. The propeller 17 is fixed to the rear end of the propeller shaft 16. Thus, the drive torque of the internal combustion engine 12 is transmitted to the propeller 17 via the drive shaft 13, the shift mechanism 14, and the propeller shaft 16.

The drive shaft 13 may be connected to the propeller shaft 16 via a transmission device. The transmission device reduces the rotational speed of the drive shaft 13 that is transmitted to the propeller shaft 16. Further, the transmission device may be incorporated in the shift mechanism 14.

The outboard motor 3 is provided with an actuator 21 that pivots the outboard motor main body 4 with respect to the hull 2. The actuator 21 may be a telescopic actuator such as an electric cylinder. The fixed end of the actuator 21 is preferably coupled to the stern bracket 6, and the movable end of the actuator 21 is preferably coupled to the swivel bracket 7. As the actuator 21 extends and contracts, the swivel bracket 7 pivots around the trim shaft 9 with respect to the stern bracket 6. Thus, as the actuator 21 extends and contracts, the outboard motor main body 4 pivots around the trim shaft 9 with respect to the hull 2.

The rotational angle of the outboard motor main body 4 relative to the hull 2 about the trim shaft 9 is defined as a trim angle. The trim angle is expressed with a minimum angle of 0% and a maximum angle of 100% with respect to the maximum rotational range of the outboard motor main body 4. When the trim angle is 0%, the case 11 of the outboard motor main body 4 is closest to the hull 2. As the trim angle increases, the lower end of the case 11 of the outboard motor main body 4 moves rearward away from the hull 2. When the boat 1 is stationary and the trim angle is 0%, the propeller shaft 16 extends approximately horizontally.

Figure 3:
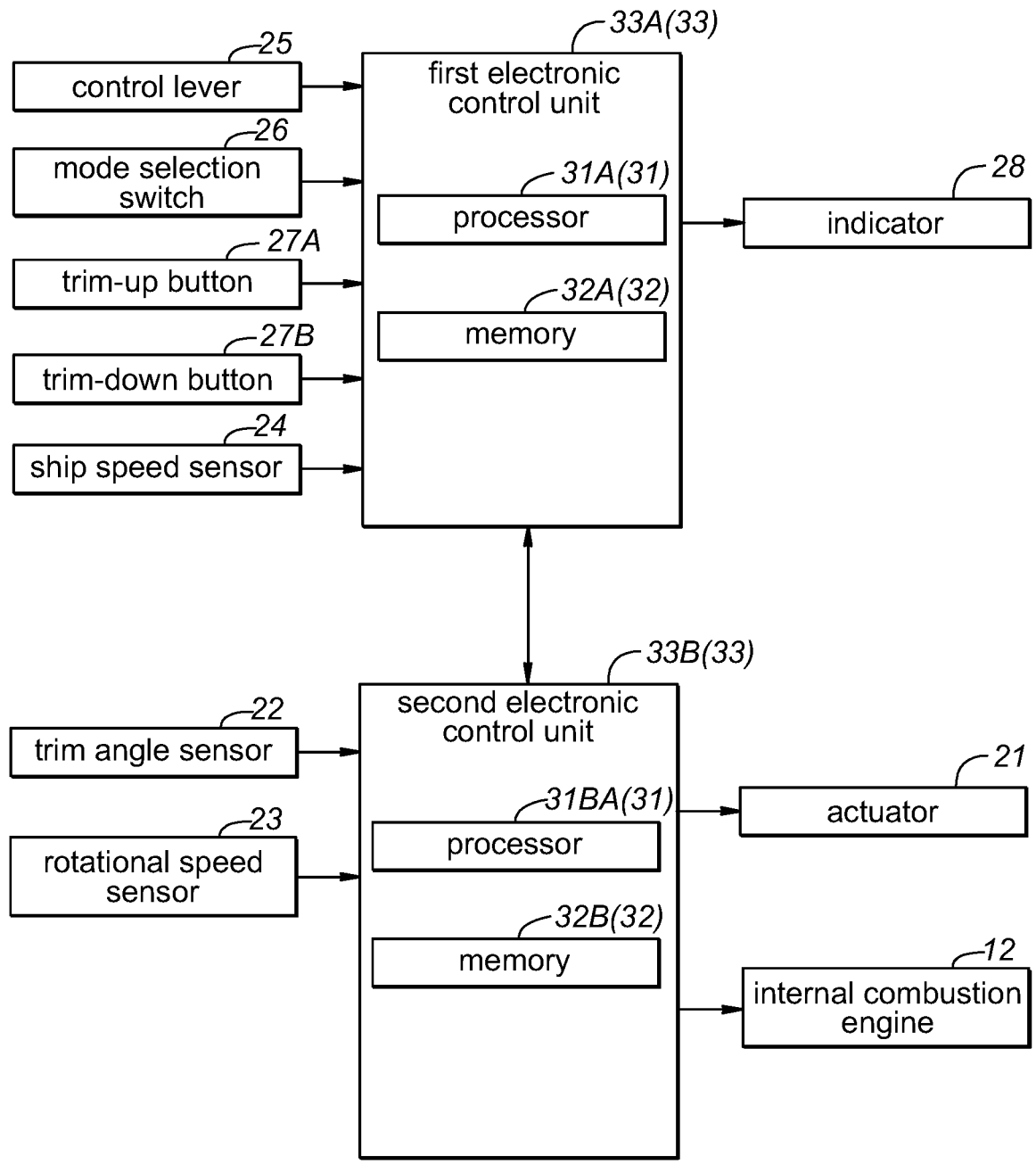
FIG. 3 is a block diagram of a support device for the outboard motor.

As shown in FIG. 3, the outboard motor 3 has a trim angle sensor 22 that outputs a signal corresponding to the trim angle, which is the angle of the outboard motor main body 4 around the trim shaft 9. The trim angle sensor 22 may be a potentiometer. The trim angle sensor 22 is preferably provided between the stern bracket 6 and the swivel bracket 7. The trim angle sensor 22 preferably outputs a voltage signal proportional to the trim angle or otherwise in dependence on the trim angle.

The output shaft or drive shaft 13 of the internal combustion engine 12 is provided with a rotational speed sensor 23 that detects the rotational speed thereof. The rotational speed sensor 23 may be a rotary encoder or a resolver.

A speed sensor 24 may be provided on the hull 2. The speed sensor 24 detects the speed (cruising speed) of boat 1. The speed sensor 24 receives a positioning signal (latitude, longitude) from a positioning satellite such as GPS, and computes the ground speed of the boat 1 based on time-series positioning results based on the received positioning signal. Alternatively or additionally, the speed sensor 24 measures the log speed of the boat 1 from a per se known boat speed sensor (such as those using electromagnetic field, a pitot tube or a paddle). It is also possible to measure the boat speed from the rotational speed of the internal combustion engine 12 detected by the rotational speed sensor 23.

As shown in FIGS. 1 and 3, a control lever 25 and a mode selection switch 26 are provided on a part of the boat 1 near the operating seat thereof for the boat operator to operate. The control lever 25 is pivotable forward and rearward from a central neutral position. The boat operator tilts the control lever 25 forward when moving the boat 1 forward, and tilts the control lever 25 rearward when moving the boat 1 rearward.

The control lever 25 is provided with a trim angle adjustment switch 27 (operation unit) for the boat operator to adjust the trim angle. The trim angle adjustment switch 27 includes a trim-up button 27A for increasing the trim angle and a trim-down button 27B for decreasing the trim angle.

The mode selection switch 26 is a switch that outputs a signal for switching between automatic trim control and manual trim control, which will be described later.

An indicator 28 is provided on the hull 2. The indicator 28 outputs information to the boat operator through images, lighting, audio, and the like. The indicator 28 may be an LED, a display, a speaker, or the like.

The outboard motor 3 is equipped with an electronic control unit 33 having a processor 31 and memory 32 connected to the processor 31 so as to transfer data to and from the processor 31. The processor 31 may include, for example, at least one of a CPU (Central Processing Unit), a GPU (Graphics Processing Unit), and a RISC (Reduced Instruction Set Computer) as a core. The memory 32 preferably includes at least one of volatile memory and non-volatile memory. The volatile memory may be, for example, DRAM (Dynamic Random Access Memory) or SRAM (Static Random Access Memory). Non-volatile memory may be a solid state drive (SSD), flash memory, magnetic disk storage, or optical disk storage. At least a part of the electronic control unit 33 may be realized by hardware such as LSI, ASIC, FPGA, etc., or may be realized by a combination of software and hardware. The processor 31 implements various applications by executing programs stored in the memory 32. The program may be stored in the memory 32 or in a removable storage medium such as a DVD or CD-ROM. In the latter case, the program may be installed in the memory 32 by reading the storage medium with a reading device. Additionally, the program may be downloaded and installed into the memory 32 via a communication network such as the Internet.

The electronic control unit 33 may be composed of a single piece of hardware, or may be composed of a plurality of pieces of communicable hardware. In this embodiment, the electronic control unit 33 includes a first control unit 33A and a second control unit 33B that can communicate with each other. Each of the first control unit 33A and the second control unit 33B has a processor 31A, 31B and memory 32A, 32B. The first control unit 33A and the second control unit 33B may be communicably connected to each other by a wire harness, or may be communicably connected to each other by wireless communication.

The electronic control unit 33 is communicably connected to the trim angle sensor 22, the boat speed sensor 24, the actuator 21, the internal combustion engine 12, the control lever 25, the trim angle adjustment switch 27, the mode selection switch 26, and the indicator 28. The control lever 25, trim angle adjustment switch 27, mode selection switch 26, indicator 28, and ship speed sensor 24 are connected to the first control unit 33A, and the trim angle sensor 22, actuator 21, and internal combustion engine 12 are connected to the second control unit 33B.

The electronic control unit 33 acquires the trim angle based on the signal from the trim angle sensor 22. The trim angle sensor 22 forwards a voltage signal to electronic control unit 33. The electronic control unit 33 calculates the trim angle based on the signal from the trim angle sensor 22 at predetermined time intervals. If the voltage signal outputted by the trim angle sensor 22 is proportional to the trim angle, the electronic control unit 33 may calculate the trim angle by multiplying the voltage signal from the trim angle sensor 22 by a predetermined coefficient. Further, the electronic control unit 33 may calculate the trim angle based on the average value of twenty current voltage signals received from the trim angle sensor 22. The interval at which the electronic control unit 33 acquires the trim angle may be, for example, 10 ms.

The electronic control unit 33 stores the acquired trim angle. The trim angle may be stored in the memory 32. The memory 32 may store a plurality of trim angles acquired at predetermined time intervals.

The electronic control unit 33 controls the rotational direction and rotational speed of the propeller shaft 16 based on the signal from the control lever 25. The control lever 25 outputs a signal corresponding to the tilt angle thereof to the electronic control unit 33. When the control lever 25 is in the neutral position, the electronic control unit 33 controls the shift mechanism 14 so as to prevent the propeller shaft 16 from rotating. When the control lever 25 is positioned forward from the neutral position, the electronic control unit 33 controls the shift mechanism 14 so as to rotate the propeller shaft 16 in the normal direction, and when the control lever 25 is positioned rearward from the neutral position, the electronic control unit 33 controls the shift mechanism 14 so as to rotate the propeller shaft 16 in the reverse direction. As the internal combustion engine 12 rotates normally, the propeller 17 rotates either normally or in reverse, and the boat 1 moves forward or rearward as commanded. The electronic control unit 33 increases the rotational speed of the internal combustion engine 12 as the amount of displacement of the control lever 25 from the neutral position increases.

The electronic control unit 33 controls the actuator 21. The electronic control unit 33 controls the actuator 21 either by automatic trim control or manual trim control. The electronic control unit 33 switches between the automatic trim mode in which automatic trim control is executed and the manual trim mode in which manual trim control is executed based on a signal from the mode selection switch 26. When the automatic trim mode is selected, the electronic control unit 33 may cause the indicator 28 to notify that the automatic trim control is being executed.

Figure 4:
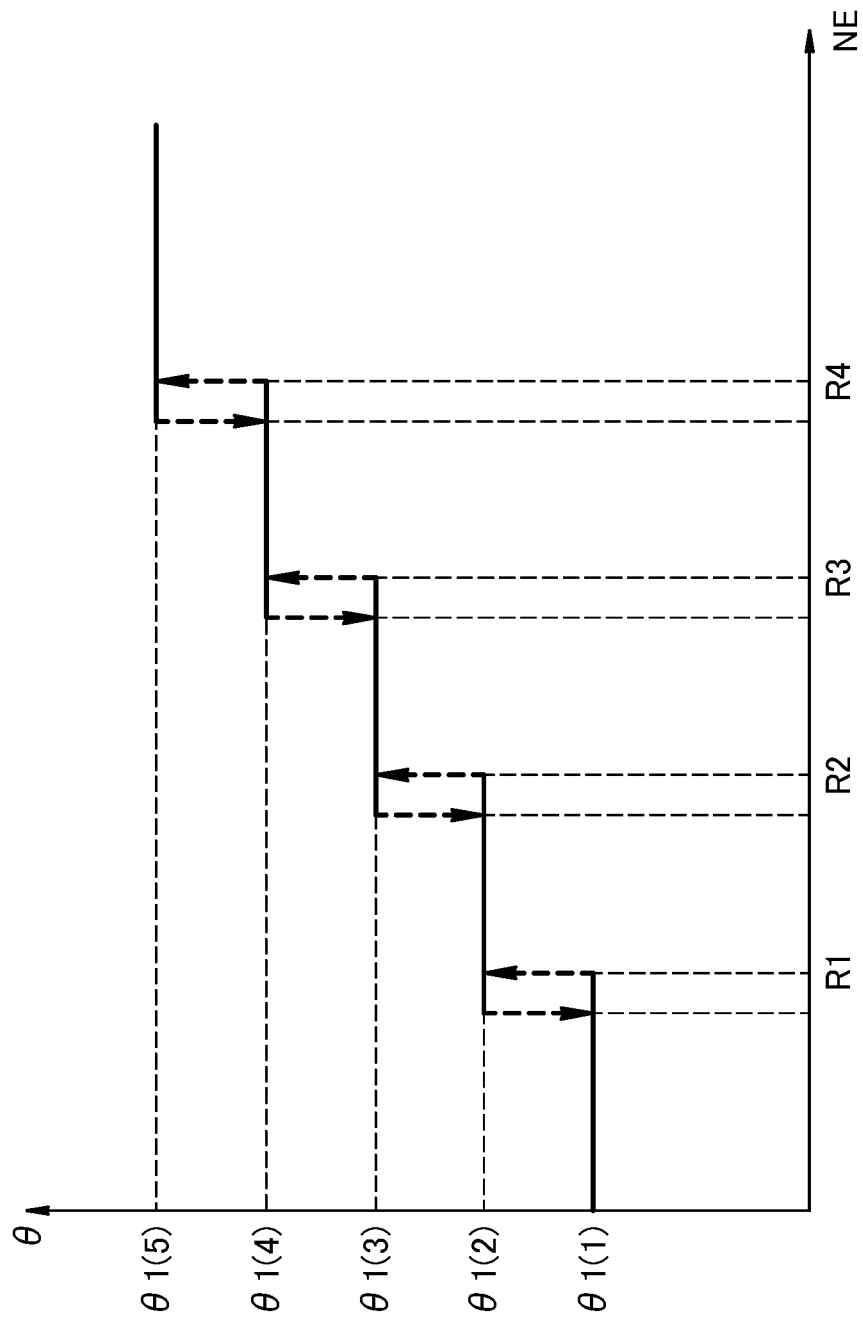
FIG. 4 is a graph showing the relationship between the rotational speed of the internal combustion engine of the outboard motor and a trim angle target value.

In the automatic trim control, the electronic control unit 33 sets a trim angle target value based on the speed of the hull 2 or the rotational speed of the internal combustion engine 12 (propulsion device main body). The trim angle target value is preset to increase as the speed of the hull 2 or the rotational speed of the internal combustion engine 12 increases. FIG. 4 is an example of a map setting the relationship between the rotational speed of the internal combustion engine 12 and the trim angle target value. As shown in FIG. 4, for example, the trim angle target value is $\theta 1$ (1) in an idle region (rotational speed $R \leq R1$), $\theta 1$ (2) in an acceleration region ($R1 \leq R < R2$), $\theta 1$ (3) in a planing region ($R2 \leq R < R3$), $\theta 1$ (4) for a medium speed range ($R3 \leq R < R4$), and $\theta 1$ (5) for a high speed range ($R \geq R4$) ($R1 \leq R2 \leq R3 \leq R4$), and $\theta 1(1) \leq \theta 1(2) \leq \theta 1(3) \leq \theta 1(4) \leq \theta 1(5)$). The trim angle target value is given with a hysteresis characteristic with respect to the rotational speed R of the internal combustion engine 12. This prevents hunting of the trim angle value in the boundaries between the different speed regions.

The electronic control unit 33 performs feedback control on the actuator 21 so that the current trim angle value approaches the trim angle target value. At this time, the electronic control unit 33 controls the actuator 21 so that the current trim angle value comes closer to the trim angle target value when the absolute value of the difference between the current trim angle value and the trim angle target value is equal to or greater than a first threshold value. The first threshold value may be considered as providing a dead zone of a feedback control. For example, when the absolute value of the difference between the current trim angle value and the trim angle target value is equal to or greater than the first threshold value, the electronic control unit 33 determines the control amount of the actuator by multiplying the difference between the current trim angle value and the trim angle target value by a feedback gain.

Upon receiving a trim-up command or a trim-down command from the trim angle adjustment switch 27 (manual trim-up/down command), the electronic control unit 33 determines a trim angle change amount $\Delta\theta$ in accordance with the trim-up command or trim-down command that was received. More specifically, when a trim-up command is received from the trim-up button 27A, a positive change amount $\Delta\theta$ is set, and when a trim-down command is received from the trim-down button 27B, a negative change amount $\Delta\theta$ is set. The positive change amount $\Delta\theta$ may be set according to the operating time (the period during which the trim-up button 27A is pressed). The negative change amount $\Delta\theta$ may be also set according to the operating time (the period during which the trim-down button 27B is pressed). The electronic control unit 33 adds the determined change amount $\Delta\theta$ to the trim angle target value $\theta 1$ to calculate a corrected trim angle target value ($\theta 2 = \theta 1 + \Delta\theta$). Then, the electronic control unit 33 performs feedback control on the actuator 21 so that the current trim angle value approaches the corrected trim angle target value.

With the automatic trim control, the boat operator can comfortably maneuver the boat by simply operating the control lever 25 without having to manually operate the trim angle adjustment switch 27. Further, even while the automatic trim control is being executed, if desired, the boat operator can change the trim angle $\theta$ by operating the trim angle adjustment switch 27.

In the manual trim control, upon receiving a trim-up command or a trim-down command from the trim angle adjustment switch 27, the electronic control unit 33 determines the operating amount of the actuator 21 of the particular trim-up command or trim-down command. More specifically, when a trim-up command is received from the trim-up button 27A, the amount of extension of the actuator 21 is set, and when a trim-down command is received from the trim-down button 27B, the amount of extension of the actuator 21 is set. The amount of extension of the actuator 21 may be set according to the operation time (the period during which the trim-up button 27A is pressed). The amount of contraction of the actuator 21 may be set according to the operation time (the period during which the trim-down button 27B is pressed). Then, the electronic control unit 33 controls the actuator 21 based on the amount of extension or contraction of the actuator 21. In other embodiments, the electronic control unit 33 may set the activation time period in the direction of extending of the actuator 21 instead of the amount of extension of the actuator 21, and set the activation time in the direction of contracting the actuator 21 instead of the amount of contraction of the actuator 21. Thus, even in the automatic trim control, the boat operator can freely change the trim angle by operating the trim angle adjustment switch 27.

The electronic control unit 33 determines if the trim angle sensor 22 is operating normally or not based on the current trim angle value and the previous trim angle value at a predetermined timing, and limits the operation of the actuator 21 when it is determined that the trim angle sensor 22 is not normal. The predetermined timing may be the timing for the electronic control unit 33 to calculate the current trim angle value. Further, the predetermined timing may be the timing when the electronic control unit 33 has received a manual command. Further, the predetermined timing may be the timing when the absolute value of the difference between the current trim angle value and the trim angle target value becomes equal to or greater than the first threshold value.

Figure 5:
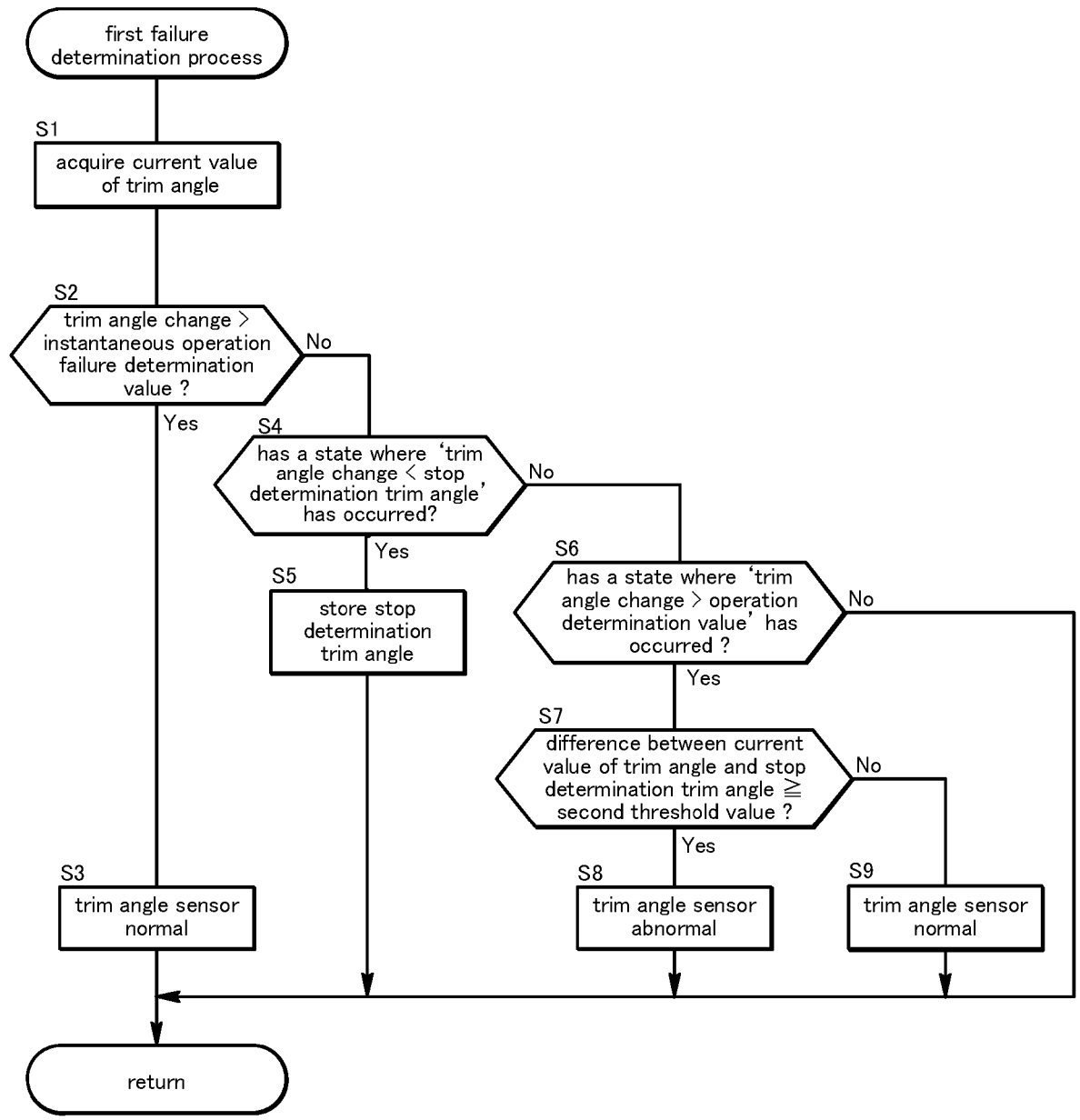
FIG. 5 is a flowchart of a first failure determination process.

The electronic control unit 33 determines if the trim angle sensor 22 is normal or not by executing the first failure determination process shown in FIG. 5 repeatedly at predetermined intervals. Suppose that the trim angle sensor 22 is normal in the initial state. The electronic control unit 33 first obtains the current trim angle value (S1) (the detected trim angle). In this embodiment, the electronic control unit 33 determines the current trim angle value based on a moving average value of a plurality of consecutive signals inputted from the trim angle sensor 22. The moving average may be performed on twenty consecutive current trim angle values that are detected at intervals of 10 ms, for instance.

First of all, the electronic control unit 33 determines if the trim angle change amount, which is the absolute value of the difference between the current trim angle and the previous trim angle (which is obtained by the moving average mentioned earlier) is larger than an instantaneous operation failure determination value (S2). The instantaneous operation failure determination value may be a limit trim angle change amount determined based on the limit extension/contraction speed of the actuator 21 or the maximum possible speed of the actuator 21. Thus, if the amount of trim angle change is larger than the instantaneous operation failure determination value, it is determined that the trim angle sensor 22 is abnormal or faulty.

If the trim angle change amount is larger than the instantaneous operation failure determination value (the determination result in S2 is Yes), the electronic control unit 33 determines that a failure has occurred in the trim angle sensor 22 (S3). This faulty condition may be only temporary or permanent. In the former case, the faulty value is disregarded, and the process is continued without interruption. If this condition persists, an error message may be issued, and the control process may be terminated. After step S3 is executed, the program flow returns to step S1.

If the trim angle change amount is equal to or less than the instantaneous operation failure determination value (No in S2), the electronic control unit 33 determines if a timing where the trim angle change amount has become smaller than the instantaneous operation failure determination value has occurred (S4). More specifically, it is determined if the difference between the current value and the previous value of the detected trim angle has transitioned from being equal to or greater than the stop determination value to being smaller than the stop determination value. If the state where the trim angle change amount is smaller than the stop determination value persists, the determination results of step S4 remains No. The stop determination value is set to a value at which it can be assumed that the actuator 21 is immobile or that the trim angle is substantially constant. In step S4, the electronic control unit 33 may also determine that the difference between the current value and the previous value of the detected trim angle has persisted to be equal to or greater than the stop determination value for a certain period of time, and has become smaller than the stop determination value.

If the timing where the trim angle change amount has become smaller than the stop determination value has occurred (the determination result in S4 is Yes), the electronic control unit 33 adopts the detected trim angle and stores the value thereof in the memory 32 as the current trim angle (S5). At this time, the newly obtained current trim angle is written over the current trim angle which is already stored the memory, or the current trim angle is updated. After step S5 is executed, the process flow returns to step S1.

If the timing where the trim angle change amount has become smaller than the stop determination value has not occurred (No in S4), the program flow advances to step S6 without storing the current value of the detected trim angle in the memory 32 to determine if the timing where the trim angle change amount has become smaller than the operation determination value has occurred (S6). In other words, it is determined if the difference between the current value and the previous value of the detected trim angle has transitioned from being equal to or smaller than the operation determination value to being greater than the operation determination value. If the state where the detected trim angle change amount is greater than the operation determination value persists, the determination results of step S4 remains No.

If the timing where the trim angle change amount has become larger than the operation determination value has occurred (the determination result in S6 is Yes), the electronic control unit 33 determines if the absolute value of the difference between the current trim angle value and the stop determination trim angle is equal to or greater than a second threshold value (failure determination value) (S7). The second threshold value is set to a value larger than the operation determination value.

If the absolute value of the difference between the current trim angle value and the stop determination trim angle is equal to or greater than the second threshold value (the determination result in S7 is Yes), the electronic control unit 33 determines that a failure has occurred in the trim angle sensor 22 (S8). In this case, an error message may be issued, and the control process may be terminated. After step S8 is executed, the process flow returns to step S1.

If a timing where the trim angle change amount has become greater than the operation determination value has not occurred (the determination result in S6 is No), the process flow returns to step S1. If the absolute value of the difference between the current trim angle value and the stop determination trim angle is less than the second threshold value (the determination result in S7 is No), the electronic control unit 33 determines that the trim angle sensor 22 is normal (S9). After step S9 is executed, the process flow returns to step S1.

Thus, if the offset error of the output voltage of the trim angle sensor 22 due to static electricity or the like is so great as to cause the difference between the absolute values of the current trim angle value and the stop determination trim angle to be equal to or greater than the second threshold value, it is determined that the trim angle sensor 22 is faulty. In the first failure determination process, when the difference between the absolute value of the current trim angle value and the stop determination trim angle becomes less than the second threshold value due to disappearance of static electricity or the like, it is determined that the trim angle sensor 22 is normal.

When the electronic control unit 33 has determined that the trim angle sensor 22 is abnormal, it prohibits automatic trim control. Further, the electronic control unit 33 causes the indicator 28 to notify that a failure has occurred in the trim angle sensor 22. Note that even if the electronic control unit 33 determines that the trim angle sensor 22 is abnormal, it is preferable to enable manual trim control. Thereby, the boat operator can freely change the trim angle by operating the trim-up button 27A and the trim-down button 27B.

According to the above embodiment, the electronic control unit 33 can detect an offset failure in which the detected value of the trim angle sensor 22 deviates from the true value by a certain amount. The offset failure is caused, for example, by static electricity being charged on the trim angle sensor 22. Since the operation of the actuator 21 is restricted when a failure occurs in the trim angle sensor 22, the actual trim angle is prevented from changing to an inappropriate value. Thereby, it is possible to provide an outboard motor 3 that can appropriately control the trim angle.

The second threshold value may be modified based on which of the trim angle target value and the current trim angle value is larger than the other. For example, when the trim angle target value is larger than the current trim angle value, the electronic control unit 33 may make the second threshold value smaller than when the trim angle target value is smaller than the current trim angle value. Thus, the electronic control unit 33 compares the trim angle target value and the current trim angle value to determine if the trim angle target value is greater than the current trim angle value or if the trim angle target value is less than the current trim angle value, and modifies the second threshold value depending on the result of this comparison. According to this aspect, when a control action to increase the trim angle is performed, a failure in the trim angle sensor 22 is determined more severely than when a control action to decrease the trim angle is performed, so that a worst situation where the propeller 17 is lifted from the water can be avoided in a more reliable manner.

Figure 6:
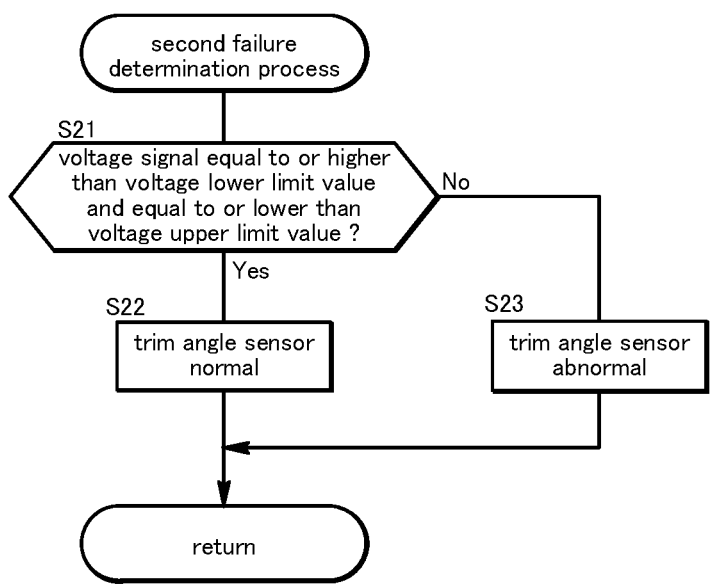
FIG. 6 is a flowchart of a second failure determination process.
Figure 7:
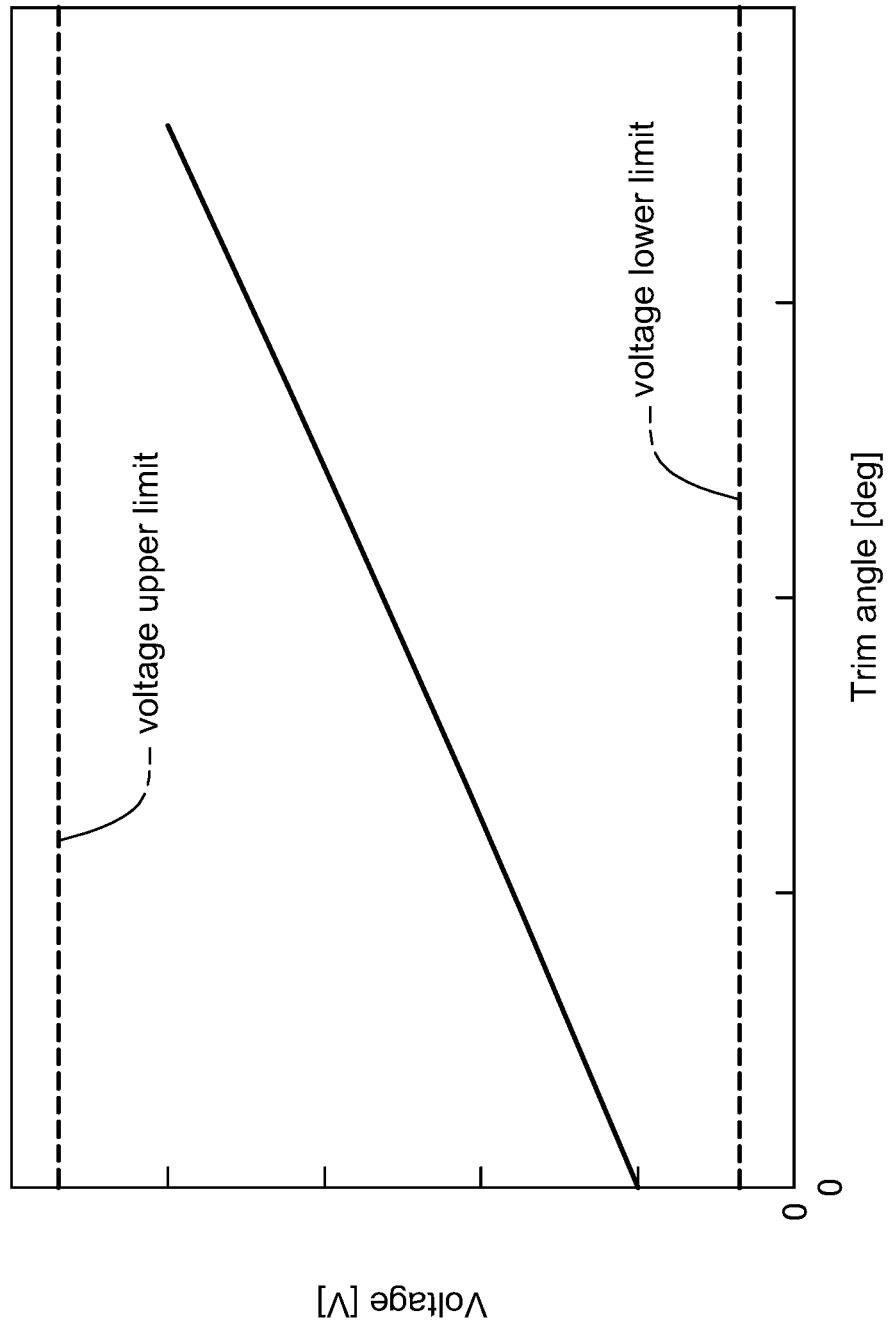
FIG. 7 is a graph showing the relationship between a trim angle and a voltage signal, and a lower voltage abnormal determination value and an upper voltage abnormal determination value for the voltage signal.

Furthermore, in addition to the first failure determination process, the electronic control unit 33 may determine if the trim angle sensor 22 is abnormal by repeatedly executing a second failure determination process shown in FIG. 6 at predetermined intervals. In the second failure determination process, the electronic control unit 33 first determines if the voltage signal inputted from the trim angle sensor 22 is equal to or higher than a lower voltage failure determination value, and if the voltage signal is equal to or lower than an upper voltage failure determination value (S21). As shown in FIG. 7, the lower voltage failure determination value and the upper voltage failure determination value are set to detect a short circuit or disconnection of the trim angle sensor 22 among other possibilities. The value of the voltage signal corresponding to the possible trim angle can range between the lower voltage failure determination value and the upper voltage failure determination value. If the voltage signal inputted from the trim angle sensor 22 is equal to or higher than the lower voltage failure determination value and is equal to or lower than the upper voltage failure determination value (determination result in S21 is Yes), the electronic control unit 33 determines that the angle sensor 22 is normal (S22). On the other hand, if the voltage signal input from the trim angle sensor 22 is less than the lower voltage failure determination value, or if the voltage signal is greater than the upper voltage failure determination value (the determination result in S21 is No), the electronic control unit 33 determines that the sensor 22 is abnormal (S23).

The second threshold value in the first failure determination process is smaller than the absolute value of the difference between the lower abnormal trim angle, which is the trim angle corresponding to the lower voltage failure determination value (lower failure determination value) and the lower limit value that the trim angle can actually take, and is also smaller than the absolute value of the difference between the upper abnormal trim angle, which is the trim angle corresponding to the upper voltage failure determination value (upper failure determination value) and the upper limit value that the trim angle can actually take.

When the electronic control unit 33 performs the second failure determination process in addition to the first failure determination process, the trim angle sensor 22 may be determined to be normal when both the first failure determination process and the second failure determination process have determined that the trim angle sensor 22 is operating normally, and to be abnormal or faulty when at least either one of the first failure determination process and the second failure determination process has determined that the trim angle sensor 22 is operating abnormally.

Figure 8:
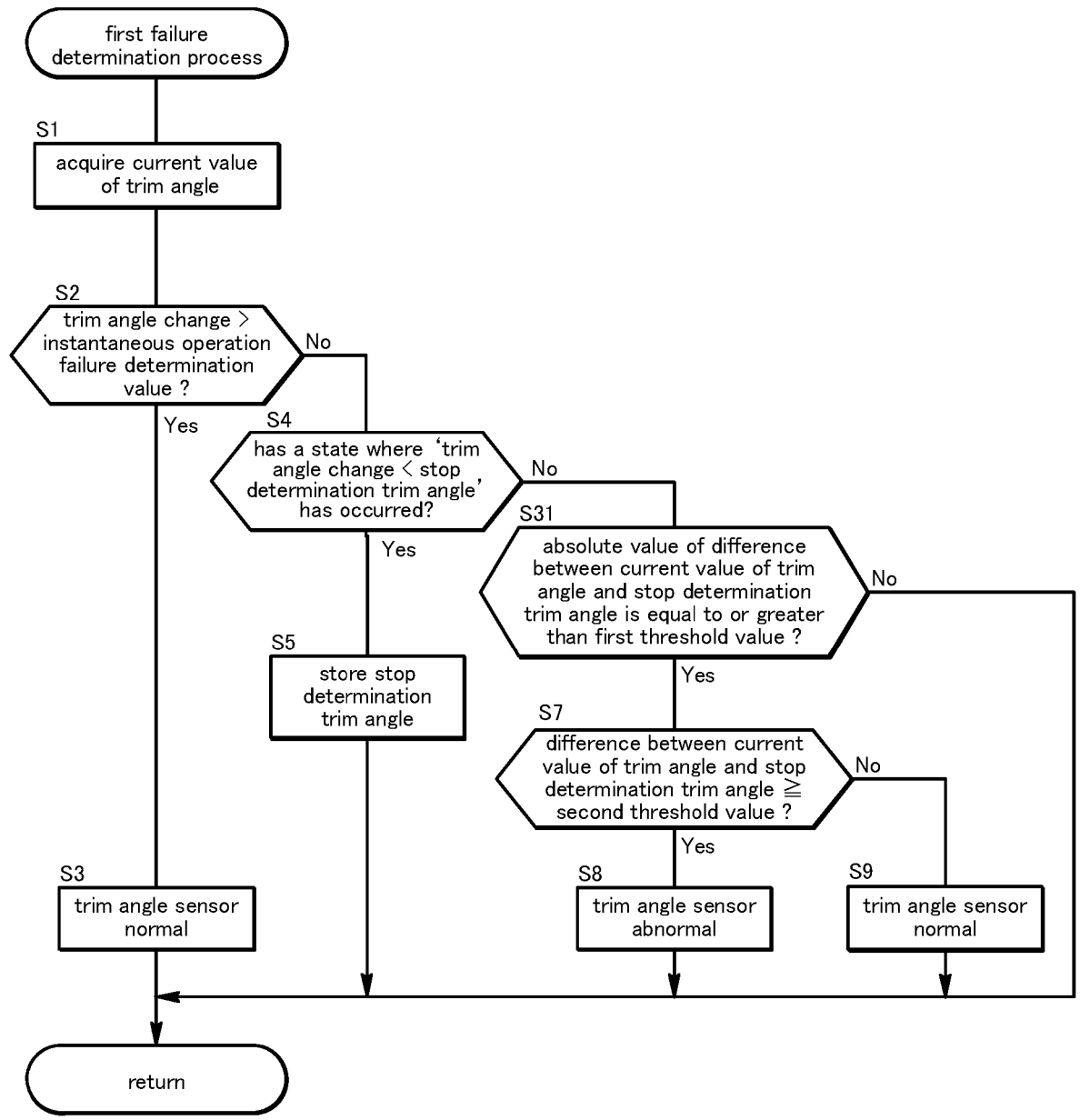
FIG. 8 is a flowchart of the first failure determination process according to a modified embodiment of the present invention.

A part of the first failure determination process in FIG. 5 may be modified as shown in FIG. 8. In the process shown in FIG. 8, step S6 in FIG. 5 is replaced with step S31. In step S31, the electronic control unit 33 determines if the absolute value of the difference between the current trim angle value and the trim angle target value is equal to or greater than the first threshold value. The trim target value changes as the rotational speed of the internal combustion engine 12 changes and the trim angle target value deviates from the current trim angle value as a result, so that the absolute value of the difference between the current trim angle value and the trim angle target value may become equal to or greater than the first threshold value. If the automatic trim control is enabled, as soon as the absolute value of the difference between the current trim angle value and the target trim angle value becomes equal to or greater than the first threshold value the electronic control unit 33 starts driving the actuator 21 in the direction to eliminate this difference. Therefore, when the absolute value of the difference between the current trim angle value and the trim angle target value becomes equal to or greater than the first threshold value, the actuator 21 is operated by the automatic trim control. Thus, if the absolute value of the difference between the current trim angle value and the trim angle target value is equal to or greater than the first threshold value (Yes in S31), the program flow advances to step S7. If the absolute value of the difference between the current trim angle value and the trim angle target value is less than the first threshold value (the determination result in S31 is No), the process flow returns to step S1. According to this aspect, the electronic control unit 33 determines if the trim angle sensor 22 is operating normally or not when the actuator 21 is controlled under the automatic trim control. As a result, when it is determined that the trim angle sensor 22 is abnormal, the operation of the actuator 21 is restricted when the actuator 21 is able to start operating.

Figure 9:
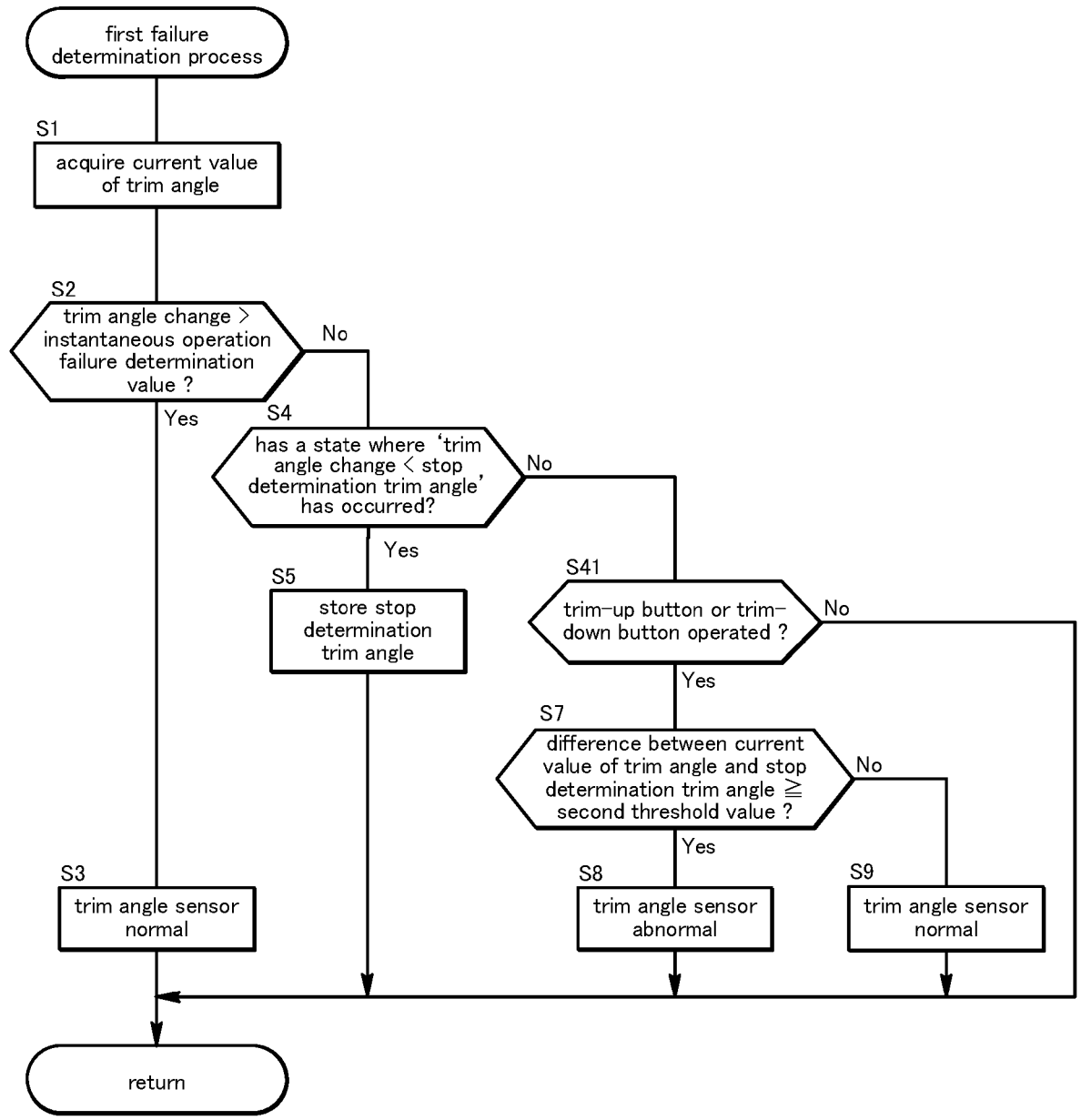
FIG. 9 is a flowchart of the first failure determination process according to another modified embodiment of the present invention

A part of the first failure determination process in FIG. 5 may be modified as shown in FIG. 9. In the process shown in FIG. 9, step S6 in FIG. 5 is replaced with step S41. In step S41, the electronic control unit 33 determines if the trim-up button 27A or the trim-down button 27B has been operated. When the trim-up button 27A or the trim-down button 27B is operated, the actuator 21 is driven according to the intention of the boat operator to change the trim angle. If the trim-up button 27A or the trim-down button 27B is operated (the determination result in S41 is Yes), the electronic control unit 33 executes the process in step S7. If neither the trim-up button 27A nor the trim-down button 27B is operated (the determination result in S41 is No), the program flow returns to step S1. According to this aspect, the electronic control unit 33 can determine if the trim angle sensor 22 is abnormal when the boat operator performs the manual trim operation. This control action may be performed simultaneously with that shown in FIG. 5.

The present invention has been described in terms of specific embodiments, but is not limited by the illustrated embodiments, and can be modified in various parts thereof without departing from the scope of the present invention. For example, the prime mover may be an electric motor instead of the internal combustion engine 12. In this case, the shift mechanism 14 may be omitted, and the drive shaft 13 and propeller shaft 16 may be connected to each other by a simple bevel gear.

The relationship between the rotational speed of the internal combustion engine 12 and the trim angle target value shown in FIG. 4 may be modified such that the trim angle target value increases or decreases continuously as the rotational speed of the internal combustion engine 12 increases or decreases instead of increasing or decreasing with the rotational speed in a step-wise manner. Further, instead of the rotational speed of the internal combustion engine 12, the trim angle target value may be changed according to the hull speed.

Furthermore, the electronic control unit 33 may perform the process of step S7 in FIG. 5 when calculating the current trim angle value. In other words, the process of step S6 in FIG. 5 may be omitted. This also allows the electronic control unit 33 to constantly monitor the trim angle sensor 22 for abnormalities.

The invention claimed is:

1. A propulsion device configured to be fitted to a hull of watercraft, comprising:
    a propulsion device main body pivotably supported by the hull around a trim shaft;
    an actuator that pivots the propulsion device main body relative to the hull about the trim shaft;
    a trim angle sensor that outputs a signal corresponding to an actual trim angle given as an angle of the propulsion device main body around the trim axis;
    an electronic control unit including a processor and memory communicably connected to the processor, and configured to calculate a detected trim angle from the signal provided by the trim angle sensor, set a target trim angle and control the actuator so as to bring the detected trim angle closer to the target trim angle,
    wherein the electronic control unit is configured to
    acquire a current value of the detected trim angle based on the signal from the trim angle sensor at predetermined time intervals,
    store the detected current trim angle as a stop determination trim angle in the memory at a timing where a difference between the current value of the detected trim angle and a previous value of the detected trim angle has become smaller than a prescribed stop determination value,
    detect a failure of the trim angle sensor from the current value of the detected trim angle and the stop determination trim angle according to a prescribed timing, and
    limit an operation of the actuator when a failure of the trim angle sensor is detected.

2. The propulsion device according to claim 1, wherein a failure of the trim angle sensor is detected when a difference between the current value and the previous value of the trim angle is greater than a maximum changing amount of the actual trim angle by the actuator.

3. The propulsion device according to claim 1, wherein the current value of the trim angle is obtained as a moving average of a plurality of consecutive detected values.

4. The propulsion device according to claim 1, wherein a failure of the trim angle sensor is detected when an absolute value of a difference between the current value of the trim angle and the stop determination trim angle is equal to or greater than a second threshold value.

5. The propulsion device according to claim 1, wherein the prescribed timing is a timing when the electronic control unit has computed a current value of the detected trim angle.

6. The propulsion device according to claim 1, further comprising an operation unit for an operator to forward a change command to change the trim angle to the electronic control unit, wherein the electronic control unit controls the actuator according to the change command, and the prescribed timing is a timing when the electronic control unit has received the change command.

7. The propulsion device according to claim 4, wherein the electronic control unit sets a trim angle target value based on a speed of the hull or a rotational speed of the propulsion device main body, executes an automatic trim control based on the trim angle target value, and performs an automatic trim angle control which controls the actuator so as to bring the current value of the trim angle comes closer to the trim angle target value when an absolute value of a difference between the value of the trim angle and the trim angle target value is equal to or greater than a first threshold value, the prescribed timing being a timing when the difference between the value of the trim angle and the trim angle target value has become greater than the first threshold value.

8. The propulsion device according to claim 7, wherein the second threshold value is larger than the first threshold value.

9. The propulsion device according to claim 4, wherein the second threshold value is made smaller when the trim angle target value is larger than the current value of the trim angle than when the trim angle target value is smaller than the current value of the trim angle.

10. The propulsion device according to claim 4, further comprising an operation unit for an operator to forward a change command to change the trim angle to the electronic control unit,
    wherein the electronic control unit controls the actuator based on the automatic trim control or the change command, and when an absolute value of a difference between the current value of the trim angle and the stop determination trim angle is equal to or greater than the second threshold value, the automatic trim control is prohibited while the change command is kept enabled.

11. The propulsion device according to claim 4, wherein the electronic control unit prohibits the automatic trim control when a value of the signal from the trim angle sensor is less than a lower failure determination value or greater than an upper failure determination value.

12. The propulsion device according to claim 11, wherein the second threshold value is smaller than an absolute value of a difference between a lower abnormal trim angle corresponding to the lower failure determination value, and a possible lower limit value of the trim angle and an absolute value of a difference between an upper abnormal trim angle corresponding to the upper failure determination value, and a possible upper limit value of the trim angle.

* * * * *